USOO8774992B2

(12) United States Patent
Yoshimoto et al.

(10) Patent No.: US 8,774,992 B2
(45) Date of Patent: Jul. 8, 2014

(54) OPERATION SUPPORT DEVICE AND AUTOMATIC OPERATION DEVICE

(75) Inventors: Koki Yoshimoto, Tokyo (JP); Kenji Kataoka, Tokyo (JP); Masashi Asuka, Tokyo (JP); Takaya Katsuragi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/499,840

(22) PCT Filed: Nov. 18, 2010

(86) PCT No.: PCT/JP2010/006769
§ 371 (c)(1),
(2), (4) Date: Apr. 2, 2012

(87) PCT Pub. No.: WO2011/086629
PCT Pub. Date: Jul. 21, 2011

(65) Prior Publication Data
US 2012/0197466 A1 Aug. 2, 2012

(30) Foreign Application Priority Data
Jan. 18, 2010 (JP) ................. 2010 008271

(51) Int. Cl.
*B61L 13/00* (2006.01)
(52) U.S. Cl.
USPC .......................................... 701/20; 701/117
(58) Field of Classification Search
USPC .................................. 701/20, 117
See application file for complete search history.

(56) References Cited

U.S. PATENT DOCUMENTS 5,828,979 A * 10/1998 Polivka et al. ............... 701/117
6,332,107 B1 * 12/2001 Gordon et al. ................. 701/20

FOREIGN PATENT DOCUMENTS

| JP | 6 171513 | 6/1994 |
| JP | 8 156793 | 6/1996 |
| JP | 10 329718 | 12/1998 |
| JP | 11 234813 | 8/1999 |
| JP | 11 243609 | 9/1999 |
| JP | 2004 266986 | 9/2004 |
| JP | 2005 231447 | 9/2005 |
| JP | 2005 349870 | 12/2005 |
| JP | 2006 6030 | 1/2006 |

OTHER PUBLICATIONS

International Search Report Issued Dec. 14, 2010 in PCT/JP10/06769 Filed Nov. 18, 2010.

* cited by examiner

*Primary Examiner* — Mary Cheung
*Assistant Examiner* — Yuen Wong
(74) *Attorney, Agent, or Firm* — Oblon, Spivak, McClelland, Maier & Neustadt, L.L.P.

(57) ABSTRACT

A next station state estimating unit estimates a preceding train position from information about a stop track circuit of a current train and from a signal aspect table. It estimates the time, at which the preceding train exits the next station and brake pattern before the station is canceled, from information about the preceding train position, from information about the occupied track circuit on which the current train is present and related information between track circuits and a station and information about occupied duration of the station, which are retained in a track database, and from a history of the preceding train position retained in a history retaining unit. The time estimated is sent to a driver's cab by a communication unit.

8 Claims, 13 Drawing Sheets

OPERATION SUPPORT DEVICE AND AUTOMATIC OPERATION DEVICE

TECHNICAL FIELD

The present invention relates to an operation support device and automatic operation device for operating a train efficiently in accordance with a state of a preceding train.

BACKGROUND ART

In a field of railway, as safety systems for preventing a collision between trains, signal systems such as an ATS (automatic train stop system) and ATC (automatic train control system) have been introduced. For example, in a single-stage brake ATC system (referred to as a "single-stage ATC" from now on), information called an ATC telegram is transmitted from the ground to a train via rails. An enterable limit track circuit (referred to as a "stop track circuit" from now on) for the following train is decided by an occupied track circuit of the preceding train, and the track circuit ID thereof is contained in an ATC telegram and is transmitted to the following train. The ATC telegram is transmitted on a track circuit basis, and includes the track circuit ID of its own, that is, the ID of the track circuit where the current train is present now. The following train calculates the remaining distance to be covered to a stopping position according to the stop track circuit ID and creates brake pattern. The train has a mechanism of considering the brake pattern as a speed limit and of braking automatically when exceeding the speed limit.

A multistage ATC system (referred to as a "multistage ATC" from now on), on the other hand, has a mechanism of transmitting speed limit information called ATC aspect via rails, and of braking automatically if the speed of the current train exceeds the speed limit indicated by the ATC aspect. Here, the ATC aspect is decided on the ground side according to a combination of the occupied track circuits of the preceding train and the current train.

A driver controls the train within the speed limit given by the ATC. In some routes, an ATO (automatic train operation system) has been introduced which controls the train automatically from a station departure to station arrival. The ATO also controls the train automatically within the speed limit given by the ATC in the same manner as the operation by a driver. To the driver or ATO, a scheduled train performance curve which indicates relationships of the position between stations and the speed is given as a reference of running. The scheduled train performance curve is designed in such a manner as to enable the train to run on schedule when moving according to it.

Normally, a train is seldom affected by the speed limit of the preceding train, and it can run on a scheduled train performance curve. However, if the train schedule is disrupted, the distance from the preceding train can reduce. Accordingly, the speed limit is altered to a lower level than the scheduled train performance curve by the ATC, and the train cannot run on the scheduled train performance curve, and sometimes has to stop temporarily between stations in a bad case. In this case, the train cannot arrive at the next station on schedule. In addition, there is a problem of increasing power consumption and deteriorating ride quality because of extra acceleration and deceleration.

Such a problem is apt to occur when the preceding train is stopped at a station and its departure is behind schedule and when the following train is moving toward the station. This is because the distance between the two trains is apt to be shortened by the amount of being stopped at the station, and the speed limit is reduced by that amount.

In normal times, if the following train retains the train timetable information about the preceding train, it can estimate the time when the preceding train will leave the station and adjust its speed according to the time. However, in conditions where the train timetable is disrupted, the train timetable information it retains in advance is useless.

As a method of solving the problem, a technique is proposed which estimates the station departure time of the preceding train on the ground side and notifies the following train of the optimum approaching speed (see Patent Document 1, for example). Here, the optimum approaching speed to be notified is the speed calculated in such a manner that enables the following train to avoid a temporary stop and that makes the time interval between departure and arrival shortest. It tries to improve the riding quality and power consumption by avoiding the temporary stop due to a speed limit by decelerating from an early stage and running slowly, and thus to prevent the train schedule from being increasingly disrupted. In addition, a technique is proposed which detects opening and shutting time of doors on the ground side and notifies the following train of that result so that the following train reduces its running speed automatically (see Patent Document 2, for example).

PRIOR ART DOCUMENT

Patent Document

Patent Document 1: Japanese Patent Laid-Open No. 6-171513/1994.
Patent Document 2: Japanese Patent Laid-Open No. 11-234813/1999.

DISCLOSURE OF THE INVENTION

Problem to be Solved by the Present Invention

However, the conventional device described in the Patent Document 1, for example, assumes that when calculating the optimum approaching speed of the following train, the following train runs exactly according to the scheduled train performance curve up to that time. Accordingly, if the following train runs at a speed different from the scheduled train performance curve, it has a problem in that the optimum approaching speed provided becomes inappropriate. In addition, since the timing of setting the optimum approaching speed and of notifying the following train of it is limited to the time of passing a following train position detector, a problem arises in that when conditions vary after passing the following train position detector, it can not cope with the change.

In addition, as for such a device as described in the Patent Document 2, it is necessary to acquire the time of opening or shutting doors of the preceding train on the ground side. To achieve this, it is necessary for the preceding train to transmit information about opening and shutting of its doors to a station by communication or to detect with a sensor placed at the station. However, many stations or trains are not provided with such equipment, and it is necessary to provide it newly. Furthermore, both the devices described in the Patent Documents 1 and 2 must be provided with a new communication device on both the ground and train when transmitting the reference speed or departure time of the preceding train calculated on the ground side to the train. Thus, the conventional devices have a problem of requiring repairs on both the ground side and train side, thereby increasing a cost of installation and maintenance.

The present invention is implemented to solve the foregoing problems. Therefore it is an object of the present invention to provide an operation support device and automatic operation device capable of avoiding excessive acceleration and deceleration before a station at low cost, and implementing smooth operation.

Means for Solving Problems

An operation support device in accordance with the present invention comprises: an intake unit for acquiring ATC information that provides information about an occupied track circuit on which a current train is present and information about a stop track circuit of the current train; a track database for retaining a signal aspect table that provides relation between a preceding train end occupying track circuit and the stop track circuit, related information between a track circuit and a station that provides which track circuit corresponds to the station, and occupied duration of a given station; a history retaining unit for holding a history of a preceding train position estimated from the information about the stop track circuit of the current train and from the signal aspect table; and a next station state estimating unit for estimating a time, at which the preceding train exits the next station and brake pattern before the station is canceled, from the information about the preceding train position estimated, the information about the occupied track circuit on which the current train is present, the related information between the track circuit and the station, information about the occupied duration of the station and the history of the preceding train position held in the history retaining unit.

Advantages of the Present Invention

The operation support device in accordance with the present invention can offer an operation support device capable of avoiding excessive acceleration and deceleration before the station and achieving smooth operation at low cost.

EMBODIMENTS FOR CARRYING OUT THE INVENTION

Embodiment 1

Figure 1:
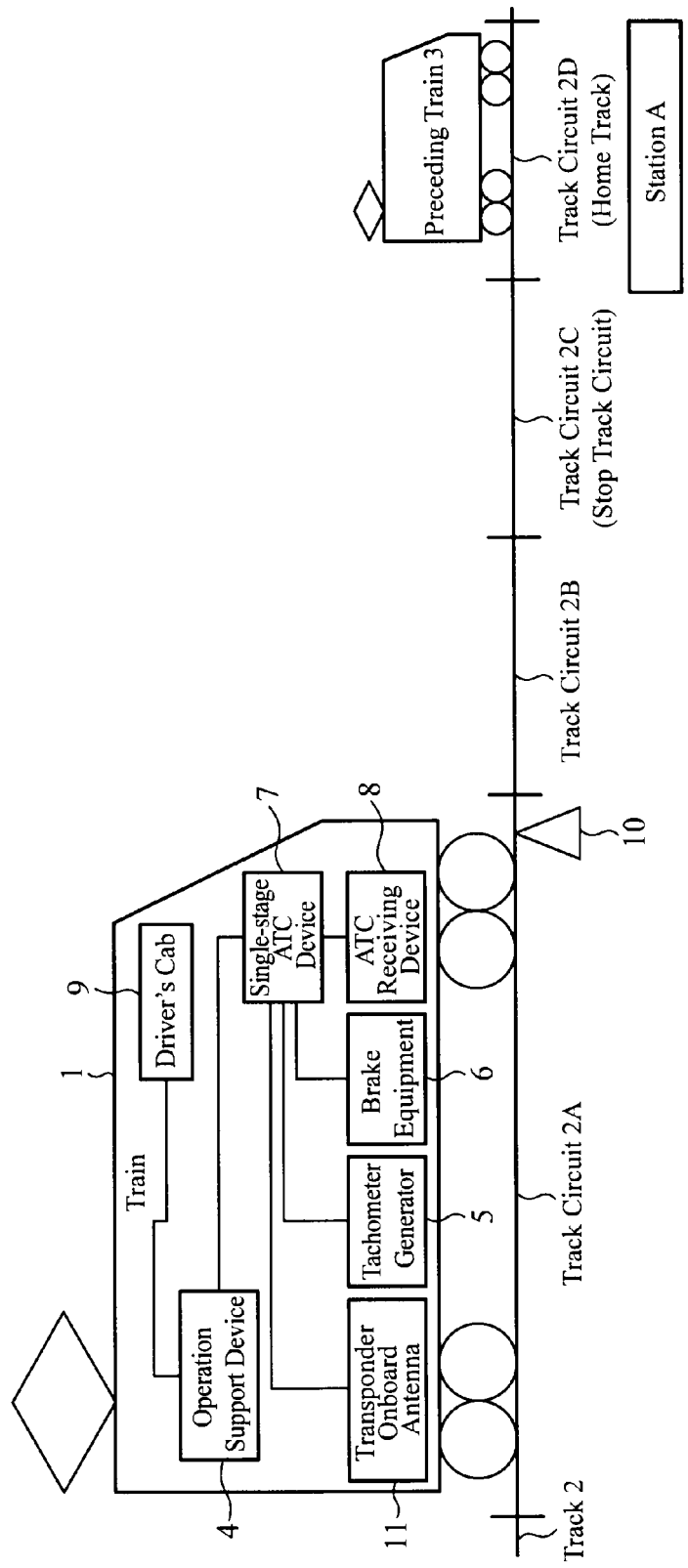
FIG. 1 is a diagram showing a safety system to which an operation support device of an embodiment 1 in accordance with the present invention is applied.
Figure 2:
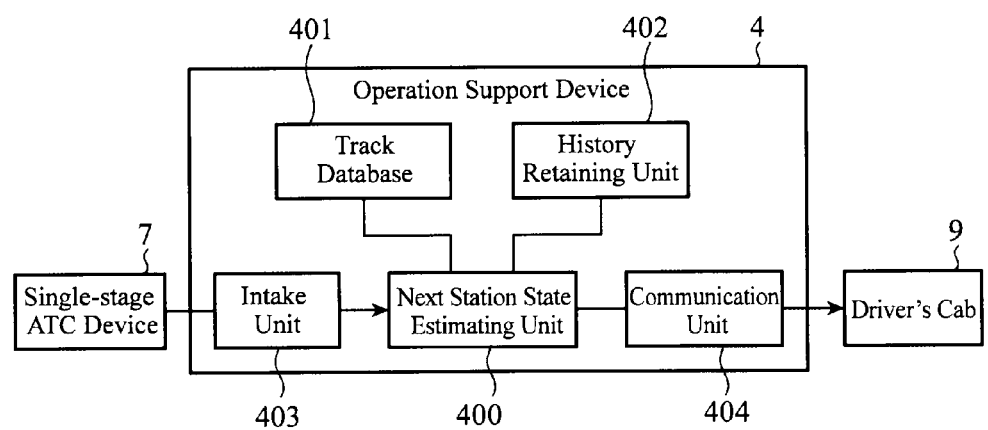
FIG. 2 is a block diagram showing a configuration of the operation support device of the embodiment 1 in accordance with the present invention.

FIG. 1 is a diagram showing a whole configuration relating to an operation support device in accordance with the present invention, and FIG. 2 is a block diagram showing a configuration of the operation support device of an embodiment 1 in accordance with the present invention. First, a system configuration of the embodiment 1 will be described with reference to FIG. 1.

A train 1 runs on a track 2. Here, the track 2 is divided into track circuits 2A-2D. In addition, a transponder ground coil 10 is placed on the track 2 and retains its own position information within it. The train 1 comprises an operation support device 4, a tachometer generator 5, brake equipment 6, a single-stage ATC device 7, an ATC receiving device 8, a driver's cab 9, and a transponder onboard antenna 11. The ATC receiving device 8, which is a device for receiving an ATC telegram via the track circuits 2A-2D, is configured in such a manner as to deliver it to the single-stage ATC device 7. The ATC telegram includes the ID of a stop track circuit and a track circuit ID on which the current train is present. Incidentally, the stop track circuit is decided according to the track circuit on which the end of the preceding train 3 is present or according to a state of a route, and corresponds to the track circuit 2C in FIG. 1, for example. The single-stage ATC device 7 obtains the position of the current train by adding the position information the transponder onboard antenna 11 acquires when passing through the transponder ground coil 10 and the position information obtained by integrating the speed information acquired from the tachometer generator 5. Furthermore, the single-stage ATC device 7 creates brake pattern that will prevent crossing a border between the stop track circuits 2C and 2D, and issues a brake command to the brake equipment 6 if the current train speed acquired from the tachometer generator 5 exceeds the brake pattern. Incidentally, in FIG. 1, the configuration of the tachometer generator 5-ATC receiving device 8 is known to the public.

The operation support device 4 is a device that estimates, from the ATC telegrams received from the single-stage ATC device 7 and the history of them, the time (home track contact making time) at which the preceding train exits the next station home track completely and the brake pattern before the station is canceled, and delivers the result to the driver's cab 9. Here, the term "home track" refers to the track circuit including the train stopping position of a station. Furthermore, that the end of the train enters the track circuit is referred to as "complete entrance", and that the end of the train leaves the track circuit is referred to as "complete exit". Furthermore, the state in which the end of the train completely exits the track circuit and no train is present on the track circuit is referred to as "contact making of the track circuit". When the preceding train makes its complete exit through the home track, the stop track circuit moves to the next one. Accordingly, the brake pattern also extends into the distance, and the speed limit on the following train is reduced.

A configuration of the operation support device 4 will be described with reference to FIG. 2. The operation support device 4 comprises a next station state estimating unit 400, a track database 401, a history retaining unit 402, an intake unit 403, and a communication unit 404. The track database 401 stores in advance such information as a signal aspect table about a single-stage ATC; position and connected information about track circuits; related information between track circuits and stations; and information about occupied duration in each station on the route and information about non-stop or stop stations for various train types. Here, the term "signal aspect table" refers to related information between the preceding train end occupying track circuit and the stop track circuit. More specifically, in FIG. 1, for example, it refers to such information as "when the track circuit 2C is a stop track circuit, the preceding train end occupying track circuit is 2D". In addition, the term "related information between a track circuit and a station" refers to information indicating which track circuit corresponds to the home track of a station. In FIG. 1, for example, it is such information as "track circuit 2D is the home track of the station A".

The history retaining unit 402 holds past preceding train end occupying track circuit information calculated by the next station state estimating unit 400 and is assumed to hold at least immediately preceding information. The next station state estimating unit 400 obtains the stop track circuit ID and the occupied track circuit ID of the current train from the single-stage ATC device 7, decides as to whether the preceding train is present on the next station home track by comparing the preceding train end occupying track circuit immediately before which is kept in the history retaining unit 402 with the signal aspect table and track circuit information in the track database 401, and further estimates the home track contact making time. The operation will be described with reference to FIG. 3 and FIG. 4.

Figure 3:
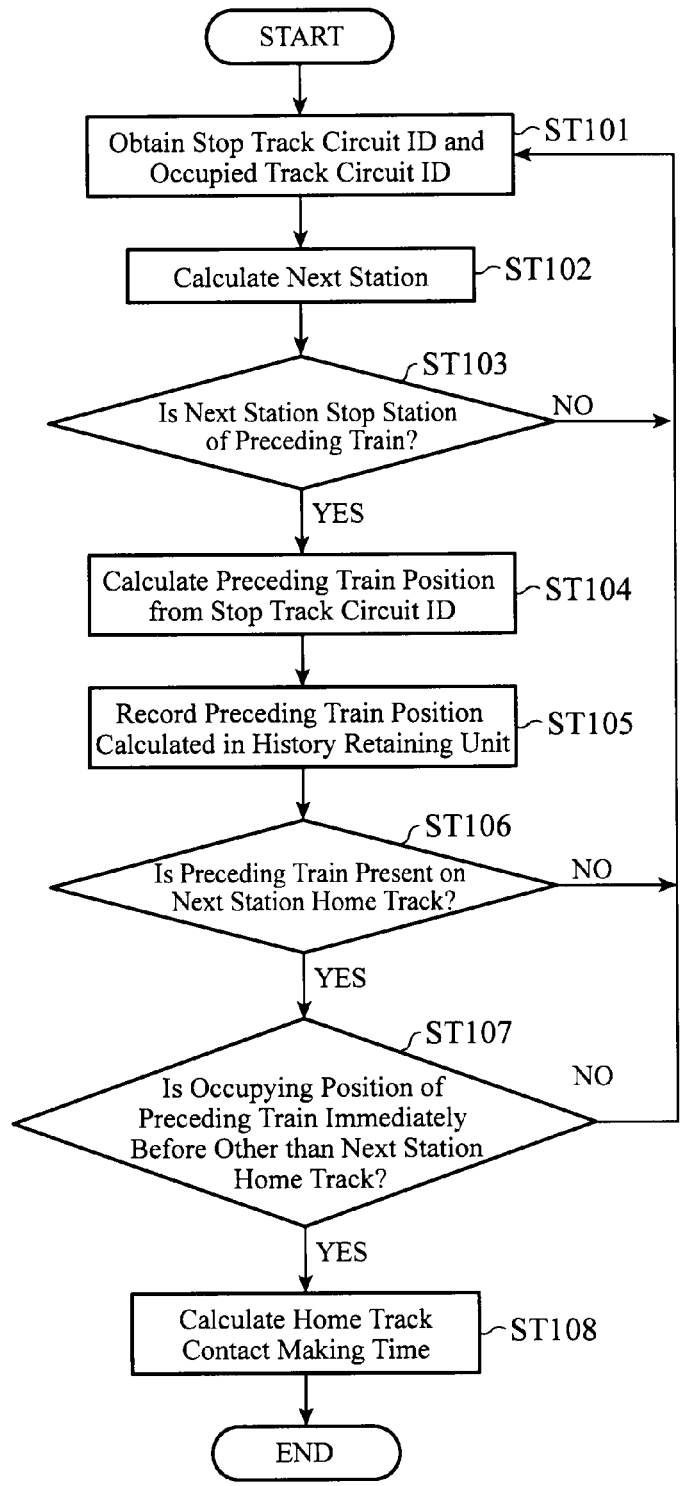
FIG. 3 is a flowchart showing the operation of the operation support device of the embodiment 1 in accordance with the present invention.
Figure 4:
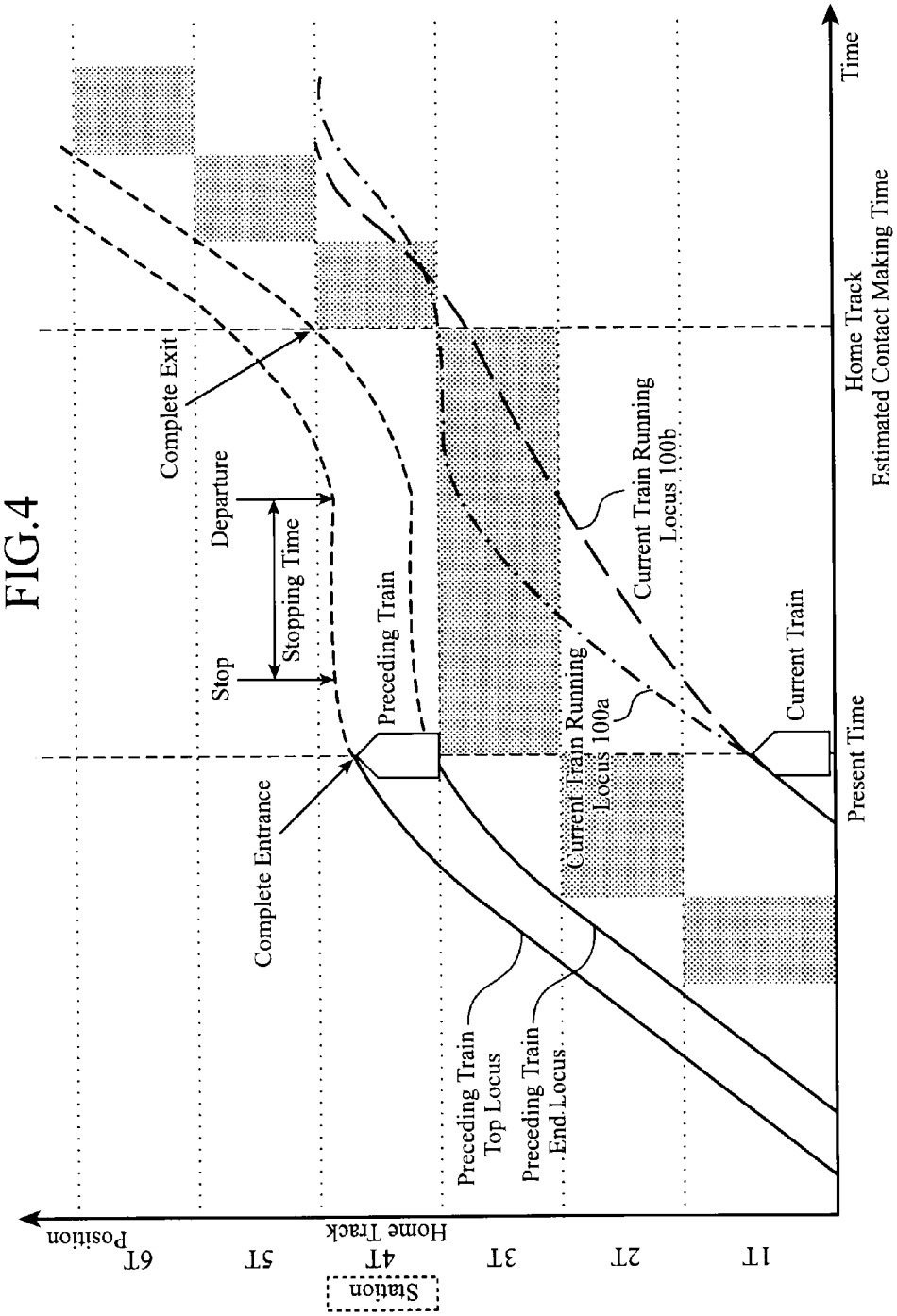
FIG. 4 is a diagram showing a running example of a train of the operation support device of the embodiment 1 in accordance with the present invention.

FIG. 3 is a flowchart showing the operation of the next station state estimating unit 400; and FIG. 4 is a diagram showing running loci of successive two trains with its horizontal axis being time and vertical axis being distance. In FIG. 4, breaks are inserted on a track circuit basis along the distance of the vertical axis. Here, 4T corresponds to the home track. At the present time shown in FIG. 4, the preceding train just makes a complete entrance into the home track 4T. At this time, the stop track circuit transmitted to the current train alters from 2T to 3T. A shaded portion indicates the stop track circuit at each time.

The next station state estimating unit 400 obtains its own occupied track circuit ID and stop track circuit ID from the single-stage ATC device 7, first (step ST101). Then, it identifies the next station by comparing the occupied track circuit ID with the related information of the track circuit and a station retained in the track database 401 (step ST102). Next, it decides as to whether the next station is a station at which the preceding train stops by comparing with the track database 401 (step ST103). Normally, unless the type of the preceding train is known, whether the preceding train stops at the next station or not is unknown. However, if the types of trains of the route are only local trains, or if the next station is a main station at which all the types of trains stop, it can be decided that the preceding train stops at the next station. If the decision result at step ST103 is NO, the processing returns to step ST101. If the decision result is YES, the next station state estimating unit 400 calculates the occupied track circuit of the preceding train end by comparing the stop track circuit ID with the signal aspect table in the track database 401 (step ST104). In FIG. 4, it corresponds to 4T. Next, it records the preceding train end occupying track circuit information calculated in the history retaining unit 402 (step ST105).

Next, the next station state estimating unit 400 decides as to whether the preceding train end occupying track circuit is the next station home track or not by comparing with the track database 401 (step ST106). Furthermore, it decides as to whether the preceding train has just made its complete entrance into the next station home track by comparing with the previous train end occupying track circuit immediately before held in the history retaining unit 402 (step ST107). More specifically, if the previous train end occupying track circuit immediately before is not the next station home track and the preceding train end occupying track circuit at present is the next station home track, the next station state estimating unit 400 decides that the preceding train has just made the complete entrance into the next station home track at this timing. In FIG. 4, 4T is the home track and since it is the timing at which the end of the preceding train has just made its complete entrance into 4T, the decision result corresponds to YES.

If the decisions at steps ST106 and ST107 are NO, the processing returns to step ST101. If these decisions are YES, then the next station state estimating unit 400 calculates a home track estimated contact making time at the next station (step ST108). The home track estimated contact making time can be obtained by adding the occupying duration in that station to the time at which the preceding train made its complete entrance into the next station home track. The occupying duration in the station can be obtained as the sum of the time from the complete entrance into the home track to the stop, standard stoppage time, and the time from its departure to the complete exit from the home track (the three time periods are collectively called "standard home track occupied duration".

The interval from the home track complete entrance to the stop and that from the departure to the home track complete exit are a section in which the train moves slowly, and even if the train schedule is disrupted, approximately the same time is expected to be required every time. These values can be calculated from standard acceleration and deceleration and the length of a train and from relationships between the stopping position and the home track position, and are assumed to be calculated beforehand and stored in the track database 401. The standard home track occupied duration can be stored in accordance with hours and days as needed. Incidentally, it is also possible to assign a fixed time to individual stations uniformly as the occupied duration in station.

The home track estimated contact making time obtained by the next station state estimating unit 400 is sent from the communication unit 404 to the driver's cab 9 and is displayed in the driver's cab 9 to be shown to the driver.

If the home track estimated contact making time is not given and so the train is operated simply, it is highly probable that the train will stop before the home track as shown by the current train running locus 100*a* in FIG. 4, for example.

In contrast with this, when the home track estimated contact making time is shown to the driver, it is expected that the driver reduces the speed in advance as shown by the current train running locus 100b of FIG. 4, thereby enabling the train to arrive at the station smoothly without stop.

The foregoing configuration makes it possible, when the preceding train occupies the next station home track, to estimate the time at which the preceding train leaves the station and the home track makes contact, and to shows them to the driver. Consulting the information, the driver can operate in such a manner as not to stop before the next station. As a result, it becomes possible to improve the ride quality and power consumption and to prevent the spread of the disruption of the train schedule.

Incidentally, instead of showing the home track estimated contact making time on an information display unit (not shown) in the driver's cab 9, it is also possible to display the time left up to that time or the next station departure estimated time of the preceding train. In addition, although the history retaining unit 402 holds the history of the preceding train end occupying track circuit, it can hold ATC telegrams received in the past. Besides, instead of obtaining the stop track circuit information and the occupied track circuit information via the single-stage ATC device 7, it is also possible to directly acquire the ATC telegrams from the ATC receiving device 8 and use them. In addition, to identify the next station, it is also possible to obtain the next station information retained in another device in the train rather than deciding it from the occupied track circuit information. Furthermore, to show the information to the driver, a dedicated display device can be used instead of displaying in the driver's cab 9. In addition, instead of displaying on a screen, speech can be used for the notification. Besides, to cancel the brake pattern before the station, it is necessary for the preceding train to completely exit a track circuit more distant than the home track depending on the settings of the ATC. At such a station, occupied duration of the station held in the track database 401 can be set by considering the combination of the track circuit of interest and the home track as a virtual home track.

As described above, according to the operation support device of the embodiment 1, since it comprises an intake unit for acquiring ATC information that provides information about an occupied track circuit on which a current train is present and information about a stop track circuit of the current train; a track database for retaining a signal aspect table that provides relation between a preceding train end occupying track circuit and the stop track circuit, related information between a track circuit and a station that provides which track circuit corresponds to the station, and occupied duration of a given station; a history retaining unit for holding a history of a preceding train position estimated from the information about the stop track circuit of the current train and from the signal aspect table; and a next station state estimating unit for estimating a time, at which the preceding train exits the next station and brake pattern before the station is canceled, from the information about the preceding train position estimated, the information about the occupied track circuit on which the current train is present, the related information between the track circuit and the station, information about the occupied duration of the station and the history of the preceding train position held in the history retaining unit. Accordingly, it can actualize an operation support device capable of implementing smooth operation at low cost.

In addition, according to the operation support device of the embodiment 1, since the next station state estimating unit detects a complete entrance of the preceding train into a home track from the preceding train position immediately before, the preceding train position at present and the related information between the track circuit and the station, and estimates a time at which the preceding train exits the next station and the brake pattern before the station is canceled by adding the occupied duration of the station to the time of the complete entrance. Accordingly, it can easily and positively estimate the time at which the brake pattern before the station is canceled.

Embodiment 2

Although the embodiment 1 is configured in such a manner as to notify a driver of the home track estimated contact making time, it is also possible to display a recommended running pattern for smooth arrival at the next station. An example thereof will be described as an embodiment 2.

Figure 5:
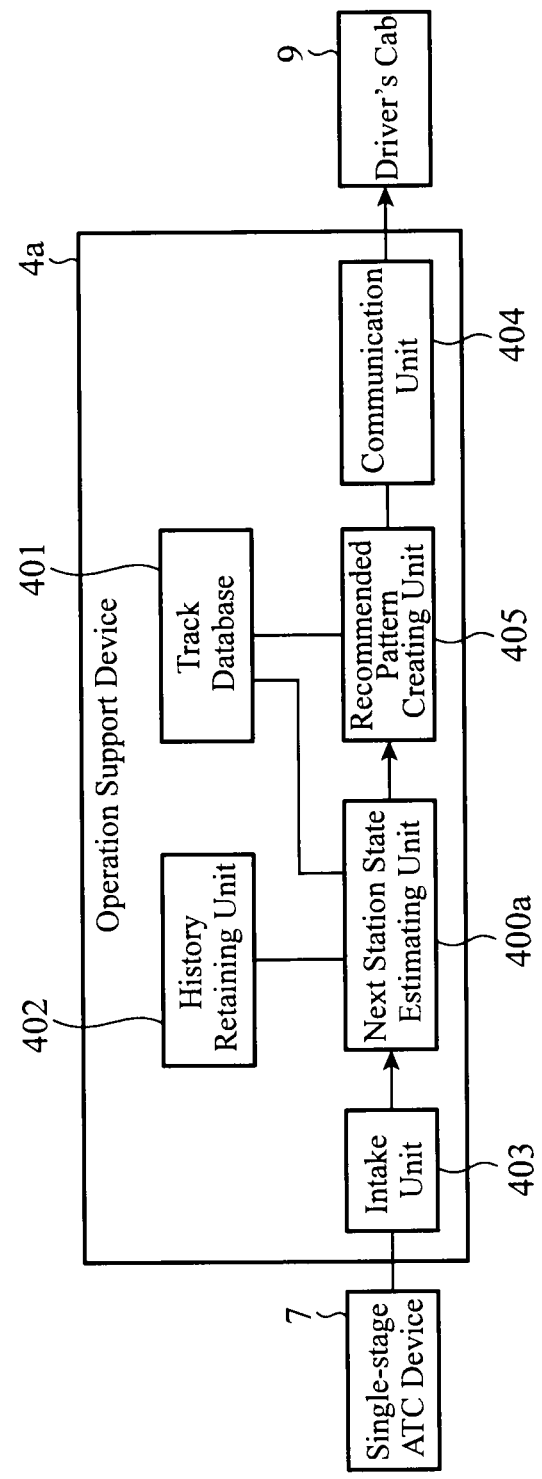
FIG. 5 is a block diagram showing a configuration of an operation support device of an embodiment 2 in accordance with the present invention.

FIG. 5 is a block diagram showing a configuration of an operation support device of the embodiment 2.

The operation support device 4a of the embodiment 2 comprises a next station state estimating unit 400a, the track database 401, the history retaining unit 402, the intake unit 403, the communication unit 404, and a recommended pattern creating unit 405. Incidentally, the single-stage ATC device 7 and driver's cab 9 in FIG. 5 are the same as those in the embodiment 1 shown in FIG. 2.

The operation support device 4a is a device that estimates, from the ATC telegrams received from the single-stage ATC device 7 and their history, the time at which the preceding train makes a complete exit from the next station home track (home track contact making time), creates a recommended running pattern for arriving at the next station smoothly in accordance with it, and sends its result to the driver's cab 9.

The next station state estimating unit 400a obtains from the single-stage ATC device 7 its own occupied track circuit ID and stop track circuit ID, and the information about the remaining distance to be covered to the stopping position and its own speed. The next station state estimating unit 400a calculates the next station home track estimated contact making time in the same procedure as that of the embodiment 1, and delivers its result, the information about the remaining distance to be covered and its own speed information to the recommended pattern creating unit 405.

The recommended pattern creating unit 405 calculates from the information obtained from the next station state estimating unit 400a the recommended running pattern for avoiding a temporary stop between stations and arriving at the next station smoothly from the present position and speed, and transmits the result to the driver's cab 9 via the communication unit 404. As for the recommended running pattern, various forms can be conceived from different points of view such as ride quality, fast arrival, energy saving and drivability. An example of the calculation method will be described with reference to FIG. 6.

Figure 6:
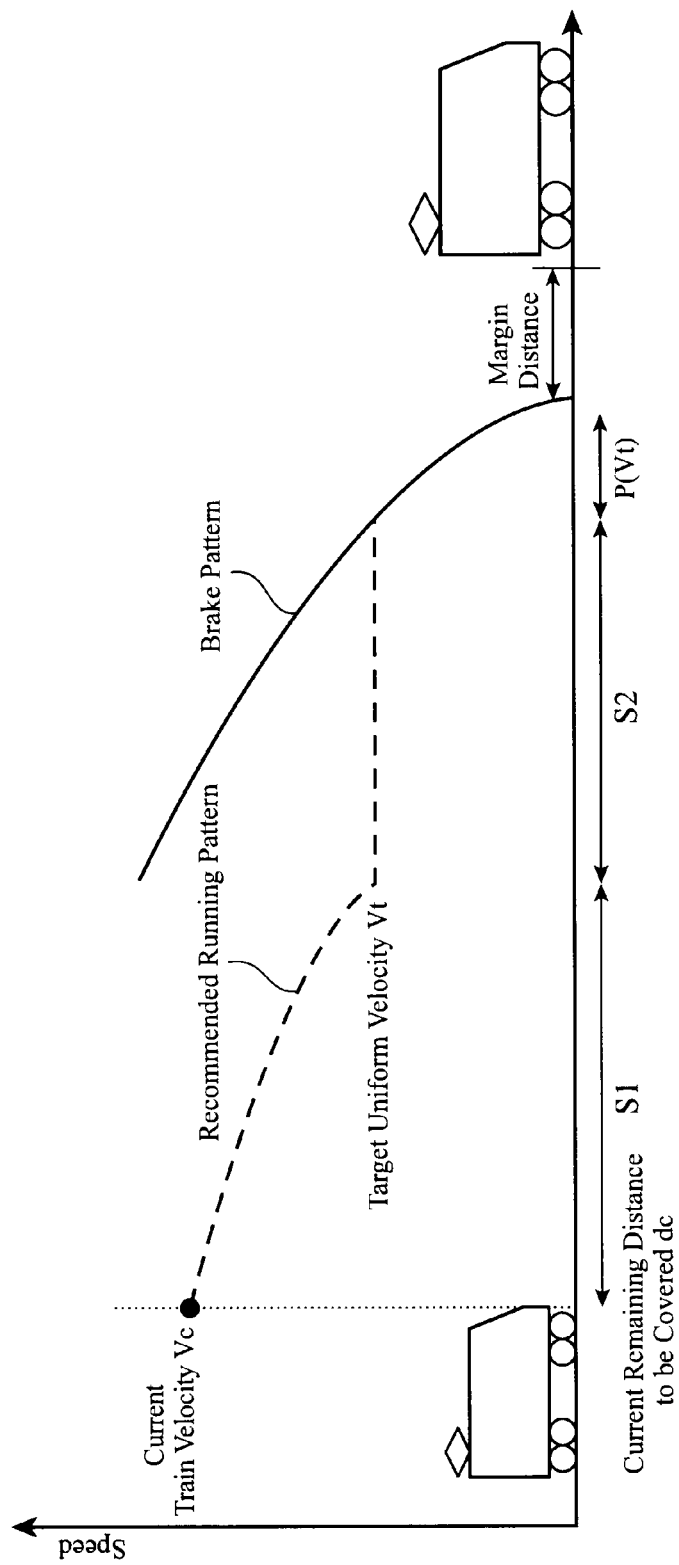
FIG. 6 is a diagram showing a recommended pattern of the operation support device of the embodiment 2 in accordance with the present invention.

As shown by the recommended running pattern of FIG. 6, it is assumed that the train reduces its speed for a distance $S_1$ at a constant deceleration $\beta_c$, and then performs uniform velocity running for a distance $S_2$ at a target uniform velocity $V_t$ until it reaches the brake pattern. The recommended pattern creating unit 405 calculates such target uniform velocity $V_t$ that will enable arrival at the brake pattern just at the timing at which the next station home track performs contact making and the stop pattern moves further away.

It is assumed that the present train speed is $V_c$, the remaining distance to be covered up to the brake pattern terminus is $d_c$, and the distance from the point corresponding to a particular speed v on the brake pattern to the pattern terminus is $P(v)$. Thus, when the train reaches the stop pattern at the target uniform velocity $V_t$, the remaining distance to be covered at that time is represented by $P(V_t)$.

If the assumed deceleration of the stop pattern is a constant $\beta_0$, P(v) is given by Expression (1), for example.

$$P(v) = \frac{v^2}{2\beta_0} \quad (1)$$

Supposing that the remaining time from the present time to the next station home track estimated contact making time is $T_r$, the reduced speed running time is $T_1$, and the uniform velocity running time $T_2$, then the relationships between the variables are given by the following Expressions (2)-(6).

$$S_1 = \frac{V_c^2 - V_t^2}{2\beta_c} \quad (2)$$

$$T_1 = \frac{V_c - V_t}{\beta_c} \quad (3)$$

$$S_2 = V_t T_2 \quad (4)$$

$$d_c = S_1 + S_2 + P(V_t) \quad (5)$$

$$T_r = T_1 + T_2 \quad (6)$$

By solving the Expression (1)-Expression (6), parameters expressing the recommended running pattern can be calculated. Incidentally, as for the deceleration $\beta_c$, it is assumed that it is set at a feasible value considering a gradient near the present position and the performance of the train. For example, it is assumed to be recorded in the track database 401 in advance as a parameter between each stations.

According to the foregoing configuration, since it can provide a driver with a concrete recommended running pattern, even if the skill of the driver is poor, it enables the driver to achieve efficient running by only operating in accordance with the recommended running pattern.

Incidentally, as a method of providing the driver with the recommended running pattern, it is possible to present the pattern in its entirety, or the speed of the pattern at that instant, or notches required to follow the pattern.

As described above, according to the operation support device of the embodiment 2, since it is configured in such a manner that it comprises the recommended running pattern creating unit for creating the recommended running pattern for the current train to arrive at the next station from the next station exit time of the preceding train the next station state estimating unit estimates and from the position and speed of the current train, and that the communication unit notifies the driver of the recommended pattern, the driver can operate the train appropriately to the next station regardless of his or her skill.

Embodiment 3

Figure 7:
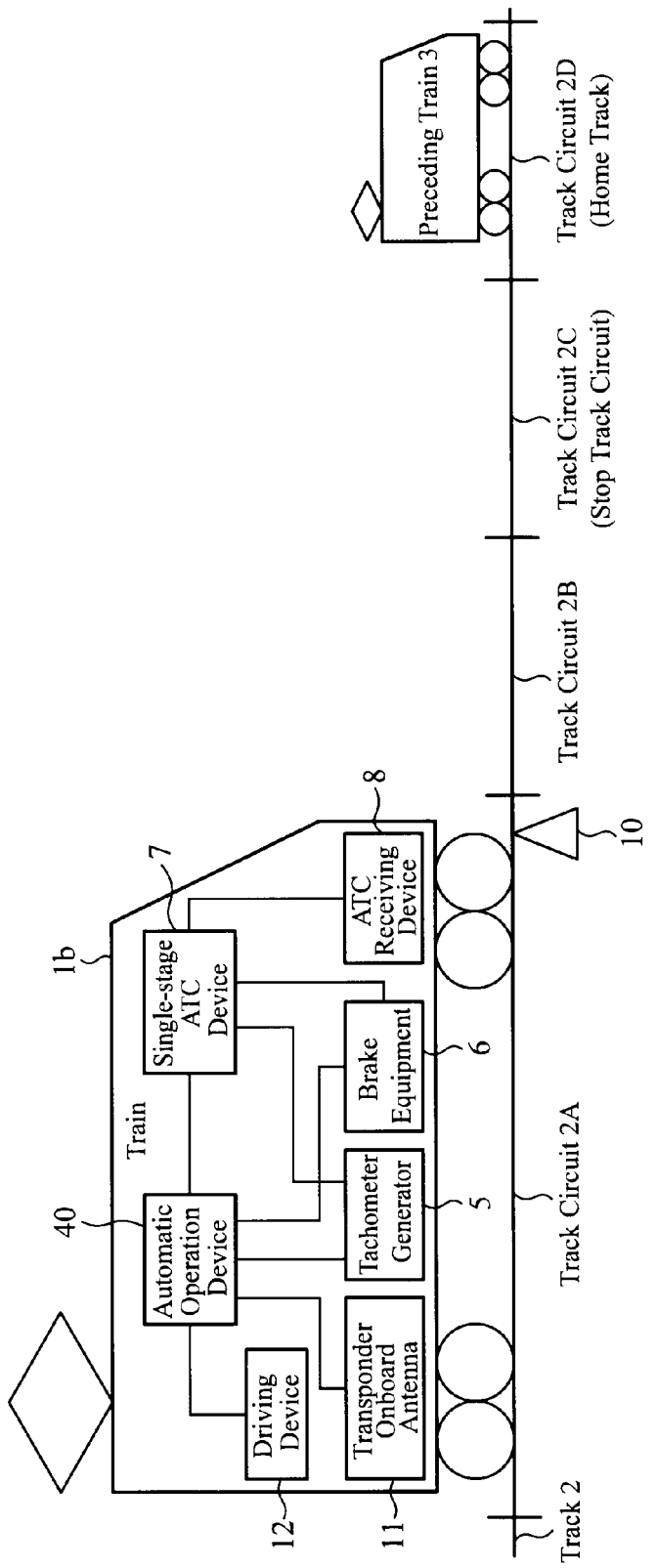
FIG. 7 is a diagram showing a safety system to which an automatic operation device of an embodiment 3 in accordance with the present invention is applied.

Although the operation support device of the embodiment 2 provides the driver with the recommended running pattern, an automatic operation device is possible which automatically outputs notches that will follow the recommended running pattern. FIG. 7 shows a configuration of the present embodiment.

In FIG. 7, the train 1b running on the track 2 comprises the tachometer generator 5, the brake equipment 6, the single-stage ATC device 7, the ATC receiving device 8, the transponder onboard antenna 11, a driving device 12, and an automatic operation device 40. Incidentally, in FIG. 7, since the preceding train 3 and the tachometer generator 5-ATC receiving device 8, the transponder onboard antenna 11 and the transponder ground coil 10 in the train 1b are the same as their counterparts of the embodiment 1, they are designated by the same reference numerals and their description will be omitted here.

The automatic operation device 40 calculates, in the same manner as the operation support device 4a of the embodiment 2, the next station home track estimated contact making time from the ATC information and history, and creates a recommended pattern corresponding to that. Furthermore, it automatically selects such a notch that will follow the recommended pattern, and supplies a notch command to the driving device 12 and brake equipment 6.

Figure 8:
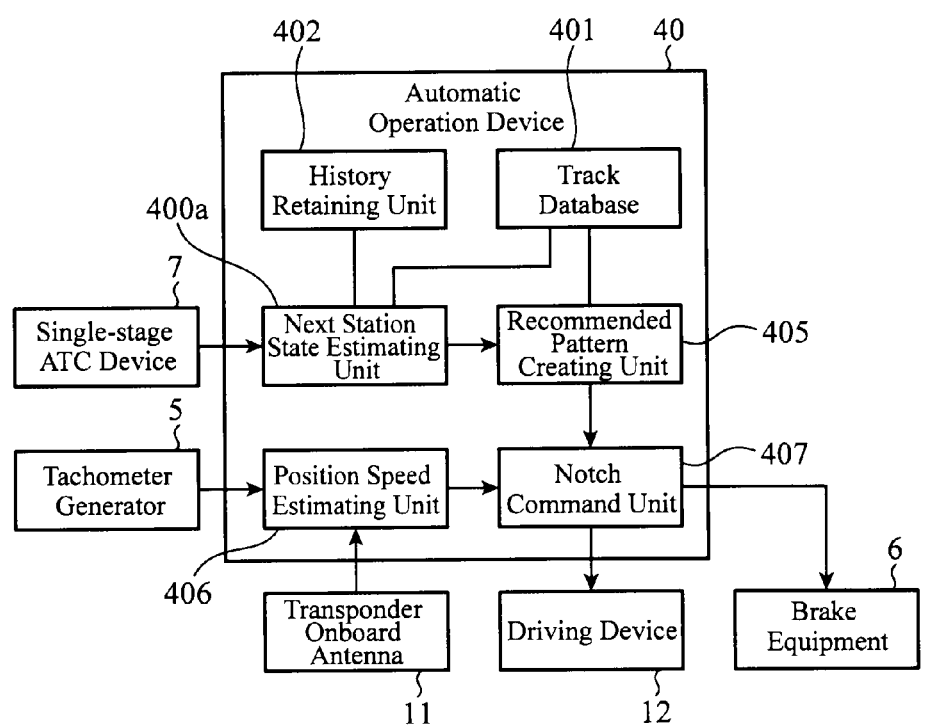
FIG. 8 is a block diagram showing a configuration of the automatic operation device of the embodiment 3 in accordance with the present invention.

The configuration of the automatic operation device 40 will be described with reference to FIG. 8. The automatic operation device 40 comprises the next station state estimating unit 400a, the track database 401, the history retaining unit 402, the recommended pattern creating unit 405, a position speed estimating unit 406, and a notch command unit 407. Here, the configuration from the next station state estimating unit 400a to the recommended pattern creating unit 405 is the same as that of the next station state estimating unit 400a—recommended pattern creating unit 405 in the embodiment 2.

In the automatic operation device 40 thus configured, the operation from estimating the home track contact making time of the next station to creating the recommended pattern therefrom is the same as that of the embodiment 2. The recommended running pattern the recommended pattern creating unit 405 creates is sent to the notch command unit 407.

The position speed estimating unit 406 integrates the speed information obtained from the tachometer generator 5, and estimates the present position of the current train by adding it to the position information acquired at the time when the transponder onboard antenna 11 passes the transponder ground coil 10. The current train position and the current train speed obtained in this way are delivered to the notch command unit 407.

Unless the recommended running pattern is given, the notch command unit 407 selects a braking notch or power running notch that will enable following a scheduled train performance curve prepared in advance. When the recommended running pattern is given, it selects the braking notch or power running notch that will enable following the recommended running pattern. Here, the selected notch is sent to the driving device 12 or brake equipment 6 so as to perform the acceleration and deceleration control of the train.

According to the foregoing configuration, it can predict, when the preceding train is present on the next station home track, the time at which the preceding train leaves the station and the home track carries out the contact making, and can achieve automatic running that will enable avoiding a temporary stop in accordance with the predicted time. Accordingly, it can improve the ride quality and power consumption, and reduce the spread of the disruption of the train schedule without any operation of a driver.

As described above, according to the automatic operation device of the embodiment 3, since it comprises, in addition to the operation support device described in the embodiment 2, the notch command unit for selecting a notch in accordance with the recommended pattern created by the recommended pattern creating unit, it can realize following the recommended pattern without depending on the operation of a driver.

Embodiment 4

Although the embodiments 1-3 are embodiments relating to the operation support device or automatic operation device on a vehicle running on the route using the single-stage ATC, they are also applicable to a route using a multistage ATC in a similar manner. The application will be described as the next embodiment 4.

Figure 9:
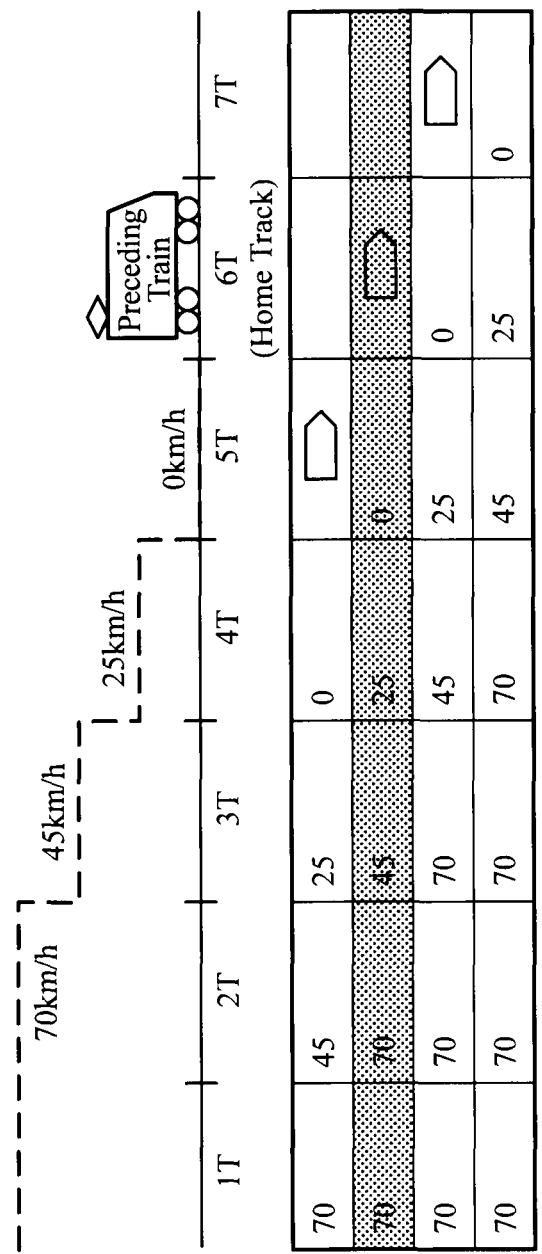
FIG. 9 is a diagram showing an example of ATC aspect of an operation support device of an embodiment 4 in accordance with the present invention.

The term "multistage ATC" refers to a system that notifies the following train of a speed limit called an ATC aspect via rails in accordance with the preceding train end occupying track circuit. The ATC aspect is decided on a track circuit basis and is transmitted. If the current train speed exceeds the ATC aspect, the onboard multistage ATC device continues to output braking until the current train speed becomes equal to or less than the ATC aspect. As for the preceding train occupying track circuit and the ATC aspect for the following train, they are decided as a signal aspect table as shown in FIG. 9, for example. In the table at a bottom part of FIG. 9, the position of the preceding train is denoted by a pentagon. For example, as shown in the second line of the table, when the preceding train occupies 6T, the ATC aspect of 0, 25, 45, 70, 70 is successively transmitted to the track circuits behind the preceding train as shown at the top part of FIG. 9. At this time, if the following train occupies 2T, for example, its speed limit is 70 km/h.

Figure 10:
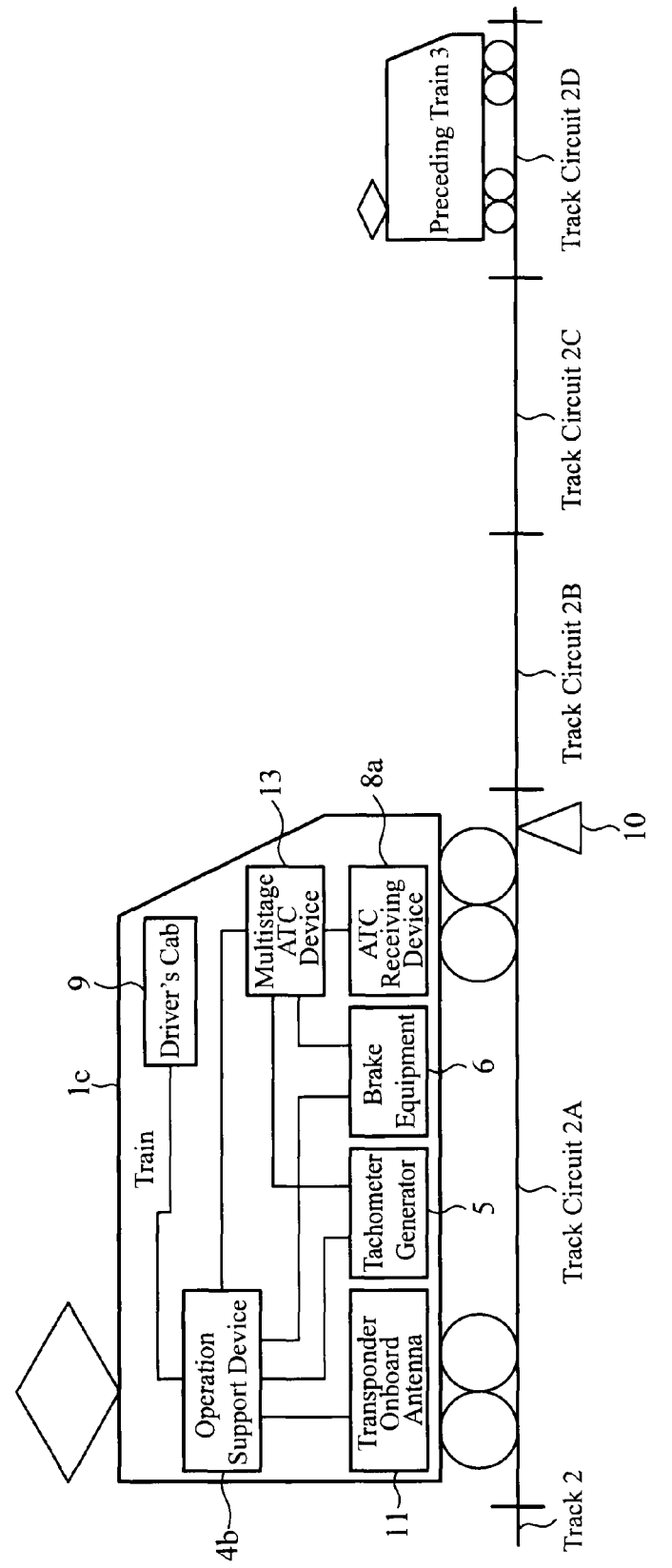
FIG. 10 is a diagram showing a safety system to which the operation support device of the embodiment 4 in accordance with the present invention is applied.

The whole system configuration of the present embodiment is shown in FIG. 10. In FIG. 10, the train $1c$ running on the track 2 comprises an operation support device $4b$, the tachometer generator 5, the brake equipment 6, an ATC receiving device $8a$, the driver's cab 9, the transponder onboard antenna 11, and a multistage ATC device 13. Incidentally, since the preceding train 3 and the tachometer generator 5, brake equipment 6 and transponder onboard antenna 11 in the train $1c$ and the transponder ground coil 10 are the same as their counterparts in the embodiments 1-3, their description will be omitted here.

The ATC receiving device $8a$ receives the ATC aspect from the track circuit and delivers it to the multistage ATC device 13. The multistage ATC device 13 compares the ATC aspect it obtains from the ATC receiving device $8a$ with the current train speed it obtains from the tachometer generator 5. If the current train speed is greater, it supplies a brake command to the brake equipment 6. In addition, the ATC aspect is transmitted from the multistage ATC device 13 to the operation support device $4b$.

Figure 11:
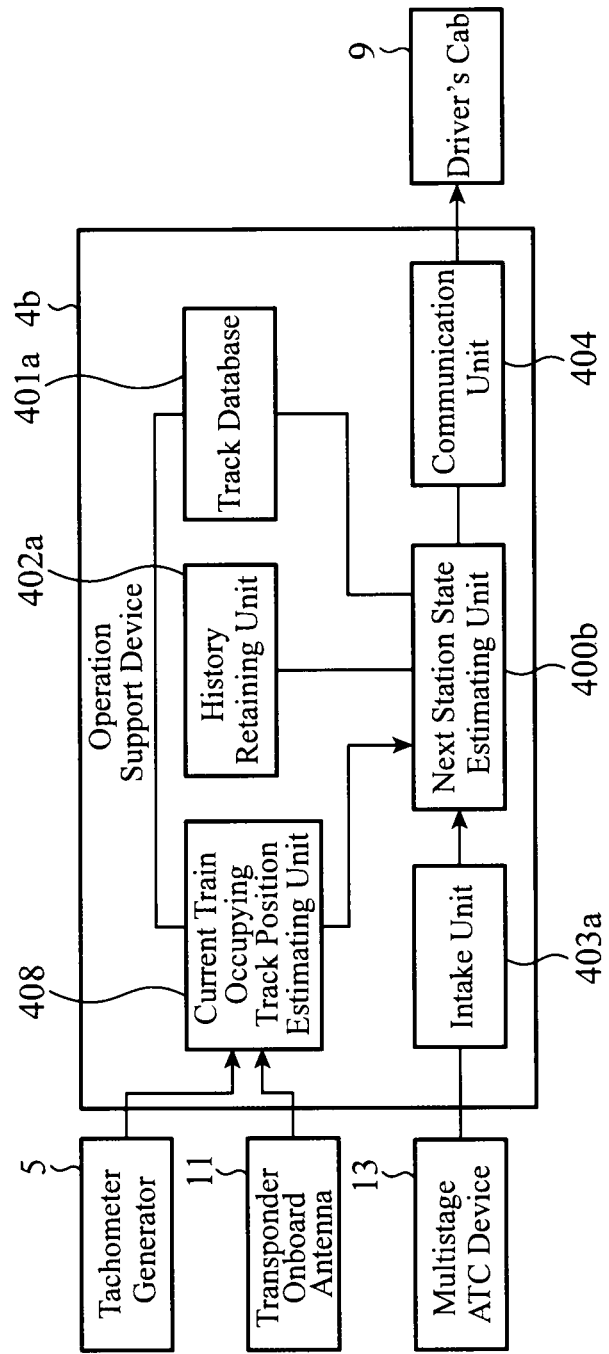
FIG. 11 is a block diagram showing a configuration of the operation support device of the embodiment 4 in accordance with the present invention.

FIG. 11 shows a configuration of the operation support device $4b$. The operation support device $4b$ comprises a next station state estimating unit $400b$, a track database $401a$, a history retaining unit $402a$, an intake unit $403a$, the communication unit 404, and a current train occupying track position estimating unit 408.

The current train occupying track position estimating unit 408 estimates the present position of the current train by adding the running distance obtained by integrating the speed information acquired from the tachometer generator 5 to the position information acquired at the time when the transponder onboard antenna 11 passes the transponder ground coil 10. It estimates the track circuit on which the current train is present by comparing the current train position thus obtained with the position information on track circuits in the track database $401a$. The current train occupying track circuit thus obtained is sent to the next station state estimating unit $400b$.

Figure 12:
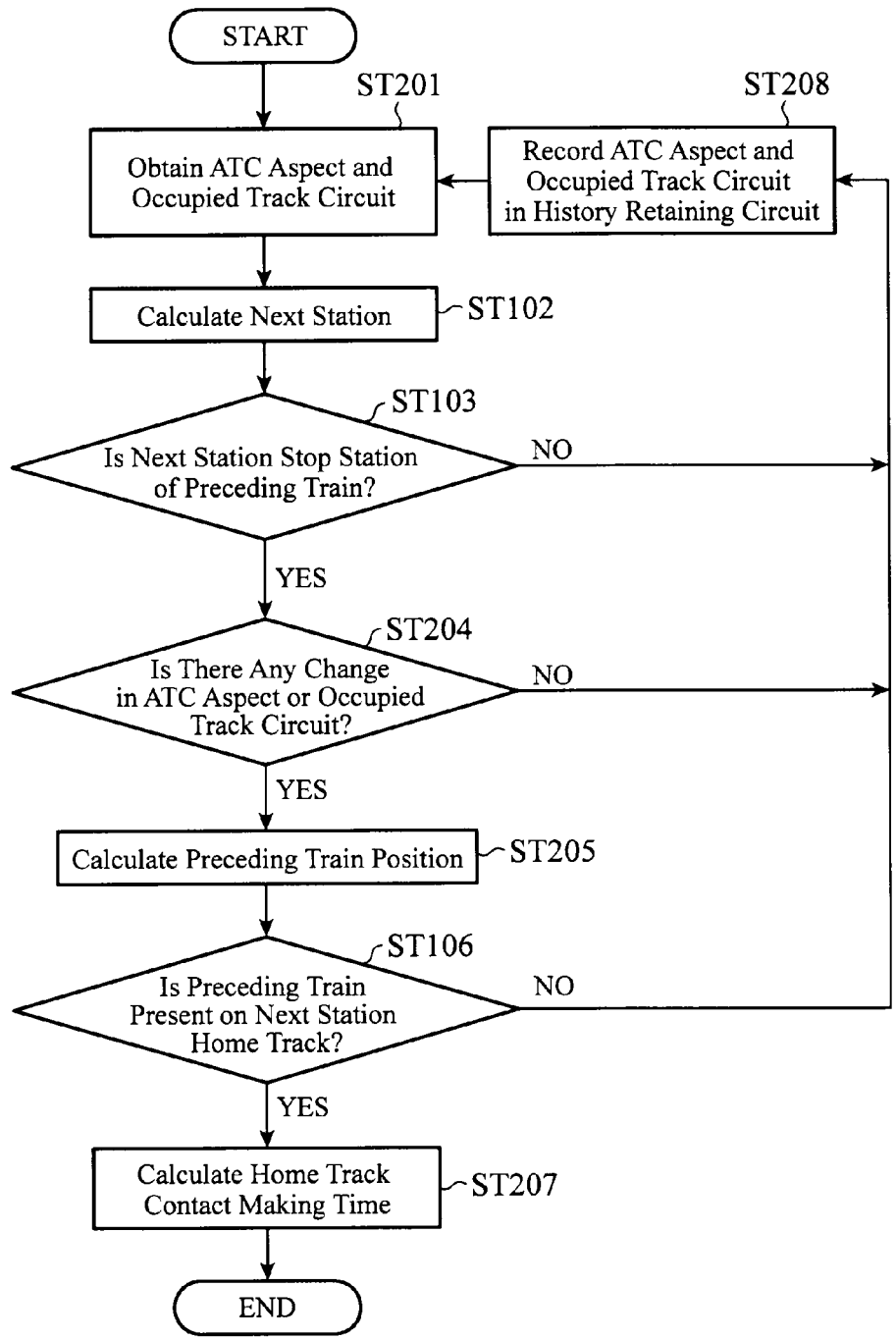
FIG. 12 is a flowchart showing the operation of the operation support device of the embodiment 4 in accordance with the present invention.

The track database $401a$ retains in advance the signal aspect table about the multistage ATC, position and connected information about track circuits, track circuit information indicating which track circuit corresponds to a home track, standard home track occupied duration information indicating the occupied duration of each station on the route, and information indicating non-stop or stop stations in accordance with train types. The history retaining unit $402a$ holds past ATC aspects, the current train occupying track circuit information and the like, and is assumed to retain at least one set of the information immediately before. The intake unit $403a$ is a unit for acquiring the multistage ATC information from the multistage ATC device 13. The communication unit 404 is a unit for notifying the driver's cab 9 of the home track estimated contact making time obtained by the next station state estimating unit $400b$ in the same manner as in the embodiment 1. The next station state estimating unit $400b$ refers to the current train occupying track circuit, ATC aspect, track database $401a$ and history retaining unit $402a$ and calculates the estimated contact making time of the next station home track. Its operation flow will be described with reference to FIG. 12. As to the operations at step ST102, ST103 and ST106, they are the same as those of the embodiment 1.

First, the next station state estimating unit $400b$ obtains the ATC aspect and the current train occupying track circuit from the multistage ATC device 13 and the current train occupying track position estimating unit 408, respectively (step ST201). Next, it identifies the next station by comparing the current train occupying track circuit with the track database $401a$ (step ST102). Next, it decides as to whether the next station is a stop station of the preceding train or not by comparing it with the track database $401a$ (step ST103). If the decision result at step ST103 is YES, it compares the ATC aspect immediately before which is stored in the history retaining unit $402a$ with the current train occupying track circuit and checks if a change occurs (step ST204). If the decision result at step ST204 is YES, then it calculates the occupied track circuit of the preceding train by comparing the ATC aspect and the current train occupying track circuit with the track database $401a$ (step ST205). Next, a calculating method thereof will be described with reference to FIG. 9.

For example, when the current train occupying track circuit is 2T and when the aspect immediately before is 45 and the present aspect is 70, such a change occurs only when the preceding train end occupying track circuit changes from 5T to 6T. Accordingly, it can determine that the preceding train makes complete entrance into 6T at this moment.

Likewise, when the current train occupying track circuit immediately before is 2T and when the ATC aspect immediately before is 70, and when the current train occupying track circuit at present is 3T and the ATC aspect at present 45, since the preceding train occupying track circuit in which this combination occurs is limited to 6T, it can decide that the preceding train is present on 6T. In this case, however, it cannot determine when the preceding train makes the complete entrance into 6T.

Next, it confirms whether the preceding train end occupying track circuit estimated at step ST205 corresponds to the next station home track or not (step ST106). If it can estimate the preceding train end occupying track circuit uniquely, and if it is the next station home track, the decision result is YES.

If the decision result at step ST103, ST204 or ST106 is NO, it records the present ATC aspect and occupied track circuit in the history retaining unit $402a$ (step ST208), and returns to step ST201.

Next, the operation support device $4b$ calculates the home track contact making time (the time at which the speed limit before the station on the following train alters to an upper level and entrance to the station becomes possible) (step ST207). If the timing at which the preceding train makes the complete entrance to the track circuit can be decided at the time of calculating the preceding train position at step ST205, the operation support device $4b$ can calculate the home track contact making time by adding to that time the standard home track occupied duration held in the track database $401a$. In some cases, however, it cannot determine the complete entrance time into the home track at step ST205 depending on the state. In this case, it decides the home track estimated contact making time by adding a value smaller than the standard home track occupied duration to the present time depending on the state. For example, it decides the home track estimated contact making time by adding half the standard home track occupied duration to the present time. This corresponds to considering that half the standard home track occupied duration has elapsed as an expected value from the present time at which the preceding train made the complete entrance into the home track. The home track estimated contact making time obtained by the next station state estimating unit 400b is transmitted to the driver's cab 9 to be displayed.

Incidentally, instead of using the standard home track occupied duration as the occupied duration in the station, it is also possible to use a particular fixed time common to all the stations. In addition, depending on the ATC settings, to enable the following train to enter a station, it is necessary for the preceding train to make a complete exit from a more distant track circuit than the home track. Such a station can consider the combination of the track circuit and the home track as a virtual home track, and set the occupied duration in station to be retained in the track database 401a.

As described above, according to the operation support device of the embodiment 4, it comprises an intake unit for acquiring multistage ATC information containing a speed limit signal on each track circuit of a current train; a track database for retaining a signal aspect table that provides relation between a preceding train end occupying track circuit and a track circuit for each speed limit signal, track circuit information that provides arrangement relationships between track circuits and relationships between the track circuits and a station, and occupied duration of a given station; a current train occupying track position estimating unit for estimating a current train occupying track circuit from a running position of the train and the track circuit information; a history retaining unit for holding a history of the multistage ATC information, and a history of information about the current train occupying track circuit estimated by the current train occupying track position estimating unit; and a next station state estimating unit for estimating a preceding train position using the information in the history retaining unit and the signal aspect table, and for estimating a time, at which the preceding train exits the next station and ATC aspect before the station changes to a higher level, from the information about the preceding train position estimated and from the track circuit information. Accordingly, even for a route that employs the multistage ATC, it can predict the contact making time of the next station home track and predict the time at which the speed limit before the station changes to a higher level that enables the train to enter the station, thereby being able to achieve a low cost smooth operation.

In addition, according to the operation support device of the embodiment 4, the next station state estimating unit estimates, when deciding that it is a time at which the preceding train has made a complete entrance into the next station home track as a result of estimating the preceding train position, the time, at which the preceding train exits the next station and the ATC aspect before the station changes to the higher level, from the information about the preceding train position estimated and from the track circuit information by adding occupied duration of the station to the present time, and estimates, when not being able to decide that it is a time at which the preceding train makes the complete entrance, the time, at which the preceding train exits the next station and the ATC aspect before the station changes to the higher level, by adding a value not greater than the occupied duration of the station to the present time. Accordingly, it can estimate the complete exit time simply and positively.

Embodiment 5

In the embodiment 1-embodiment 4, the next station home track estimated contact making time is calculable only when it is known that the preceding train stops at the next station. When it is unknown whether the preceding train does not stop at the next station or not, it is difficult to carry out appropriate estimation. Thus, an example capable of solving the problem by adding a non-stop/stop estimation function for deciding non-stop or stop stations of the preceding train will be described as an embodiment 5 next.

Figure 13:
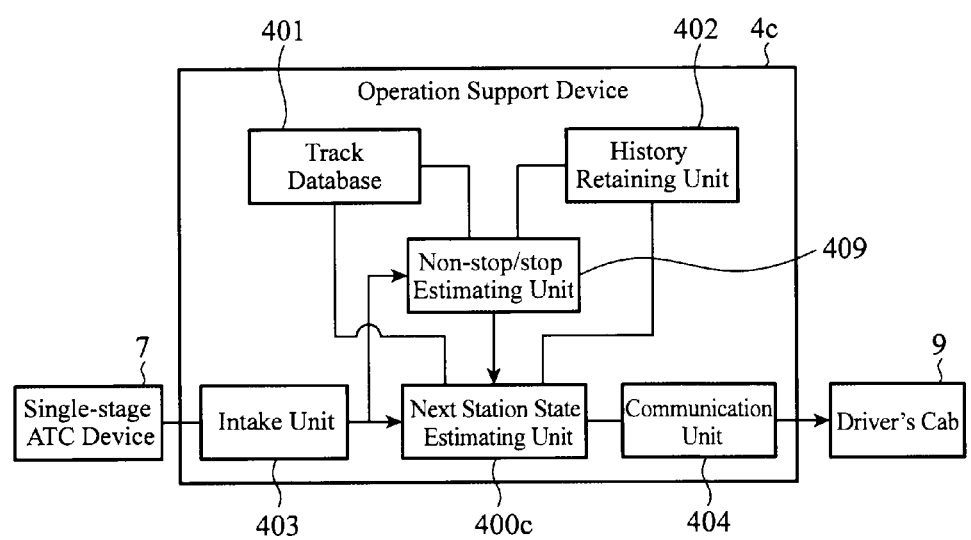
FIG. 13 is a block diagram showing a configuration of an operation support device of an embodiment 5 in accordance with the present invention.

FIG. 13 is a block diagram showing a configuration of an operation support device of the embodiment 5.

The operation support device 4c comprises the track database 401, the history retaining unit 402, the intake unit 403, the communication unit 404, a non-stop/stop estimating unit 409, and a next station state estimating unit 400c. Incidentally, as for the track database 401-communication unit 404, they are the same as their counterparts of the embodiment 1. The non-stop/stop estimating unit 409 measures the time period from the complete entrance into to the complete exit from the track circuit immediately before the next station home track, decides whether the preceding train is a non-stop train or stop train, and delivers the decision result to the next station state estimating unit 400c.

Although the operation of the next station state estimating unit 400c is the same as that of the embodiment 1 shown in FIG. 3, it uses, when deciding at step ST103 as to whether the next station is a non-stop or stop station of the preceding train, the estimated result obtained from the non-stop/stop estimating unit 409. The operation of the non-stop/stop estimating unit 409 will now be described.

When the preceding train passes the next station without stopping, it will run before the next station faster than when it stops.

Accordingly, the occupied duration of the track circuit immediately before the home track will be shorter in the case of a non-stop than in the case of a stop. Consequently, by calculating the complete entrance time and complete exit time of the track circuit immediately before the home track (referred to as a "non-stop/stop decision track circuit" from now on) in the same manner as the embodiments 1-4 calculate the home track complete entrance time, the occupied duration of the non-stop/stop decision track circuit is measurable. If the occupies duration of the non-stop/stop decision track circuit calculated is not greater than a threshold, the preceding train is decided as a non-stop. As for the threshold, it is assumed to be stored in the track database 401.

In FIG. 1, for example, it is assumed that the track circuit 2C immediately before the station A is the non-stop/stop decision track circuit. When the length of the track circuit 2C is L and the speed at which the train passes the station A on the scheduled train performance curve of the non-stop train is $V_a$, the estimated time that the non-stop train takes from the complete entrance into the track circuit 2C to the complete exit therefrom is about $V_a/L$. The estimated time plus a margin time α can be employed as the foregoing threshold. Assuming that the time from the complete entrance into the track circuit 2C to the complete exit therefrom of the preceding train, which is measured by the following train, is $T_s$. Then if the following Expression (7) holds, a decision can be made that the preceding train is a non-stop train.

$$T_s \le \alpha + \frac{V_a}{T} \quad (7)$$

According to the foregoing configuration, it can estimate a non-stop or stop station even for the stations as to which a decision cannot be made whether they are a non-stop or stop station so far. Thus, the next station state estimating unit 400c can predict the next station home track contact making time as to such stations.

Incidentally, as the track circuit used for the non-stop/stop estimation, the home track itself can be used instead of the track circuit immediately before the home track. In this case, since a certain time is necessary for making a non-stop/stop decision after the preceding train makes a complete entrance into the home track, the next station home track contact making prediction must be suspended during that period. In addition, although it is applied to the configuration of the embodiment 1 in the foregoing example, it is also applicable to the configuration of the embodiment 4 employing the multistage ATC. In this case, however, it is necessary to retain the history of the preceding train position obtained by the next station state estimating unit 400c.

As described above, according to the operation support device of the embodiment 5, it further comprises a non-stop/stop estimating unit for comparing a time necessary for the preceding train to pass through a track circuit before the next station with a predetermined threshold, and for deciding that the preceding train will stop at the next station when the time of passing through is longer than the threshold, wherein the next station state estimating unit alters a method of estimating the time at which the preceding train exits the next station in accordance with a decision result of the non-stop/stop estimating unit. Accordingly, even if it does not have any information as to whether the preceding train passes the next station without stop or not, it can decide the non-stop or stop of the preceding train, thereby being able to estimate the home track complete exit time precisely.

Embodiment 6

Although the embodiment 1-embodiment 4 detect the time at which the preceding train makes a complete entrance into the home track, and estimate by using it as the reference the cancellation of the brake pattern before the station or the time at which the speed limit changes to the higher level, it is also possible to detect the time at which the preceding train makes a complete entrance into a track circuit before the home track and to employ it as the reference. In this case, as the occupied duration of the station, the period of time is used from the time at which the preceding train makes the complete entrance into the track circuit before the station to the time at which it makes a complete exit from the home track. According to the present embodiment, since it can estimate the cancellation of the brake pattern before the station or the time at which the speed limit changes to the higher level at an earlier stage, it can support more smooth operation.

INDUSTRIAL APPLICABILITY

As described above, the operation support device in accordance with the present invention can avoid excessive acceleration and deceleration before the station at low cost according to the state of the preceding train. Accordingly, it is useful for implementing a railway system capable of achieving comfortable ride and reducing the power consumption.

REFERENCE NUMERALS

1, 1a, 1b, 1c train; 2 track; 2A, 2B, 2C, 2D track circuit; 3 preceding train; 4, 4a, 4b, 4c operation support device; 5 tachometer generator; 6 brake equipment; 7 single-stage ATC device; 8, 8a ATC receiving device; 9 driver's cab; 10 transponder ground coil; 11 transponder onboard antenna; 12 driving device; 13 multistage ATC device; 400, 400a, 400b, 400c next station state estimating unit; 401, 401a track database; 402, 402a history retaining unit; 403, 403a intake unit; 404 communication unit; 405 recommended pattern creating unit; 406 position speed estimating unit; 407 notch command unit; 408 current train occupying track position estimating unit; 409 non-stop/stop estimating unit.

What is claimed is:

1. An operation support device comprising:
   an intake unit for acquiring automatic train control information that provides information about an occupied track circuit on which a current train is present and information about a stop track circuit of the current train;
   a track database for retaining a signal aspect table that provides a relation between a preceding train end occupying track circuit and the stop track circuit, related information between track circuits and stations that shows which track circuit corresponds to a station, and an occupied duration at each station;
   a history retaining unit for holding a history of a preceding train position estimated from the information about the stop track circuit of the current train and from the signal aspect table;
   a brake pattern determining unit for determining a brake pattern of the current train before reaching the next station from the information about the occupied track circuit on which the current train is present and the information about the stop track circuit of the current train; and
   a next station state estimating unit for estimating a time at which the preceding train exits the next station, the time indicating a time when the stop track circuit moves forward by at least a track circuit and when the brake pattern changes to another brake pattern that allows a higher speed limit than the brake pattern, from the estimated information about the preceding train position, the information about the occupied track circuit on which the current train is present, the related information between the track circuits and the stations, information about the occupied duration at each station and the history of the preceding train position held in the history retaining unit.

2. The operation support device according to claim 1, wherein
   the next station state estimating unit detects a complete entrance of the preceding train into a home track from the preceding train position immediately before, the preceding train position at present and the related information between the track circuits and the stations, and estimates a time at which the preceding train exits the next station by adding an occupied duration of the preceding train at the next station to the time of the complete entrance.

3. The operation support device according to claim 2, further comprising:
   a non-stop/stop estimating unit for comparing a time necessary for the preceding train to pass through a track circuit that is located just before the next station with a predetermined threshold, and for deciding that the preceding train will stop at the next station when the time of passing through is longer than the threshold, wherein the next station state estimating unit estimates a time at which the preceding train exits the next station if a decision result of the non-stop/stop estimating unit indicates a stop at the next station.

4. The operation support device according to claim 1, further comprising:

a non-stop/stop estimating unit for comparing a time necessary for the preceding train to pass through a track circuit that is located just before the next station with a predetermined threshold, and for deciding that the preceding train will stop at the next station when the time of passing through is longer than the threshold, wherein the next station state estimating unit estimates a time at which the preceding train exits the next station if a decision result of the non-stop/stop estimating unit indicates a stop at the next station.

5. An operation support device comprising:

an intake unit for acquiring multistage automatic train control information containing a speed limit signal on each track circuit for a current train;

a track database for retaining a signal aspect table that provides relation between a preceding train end occupying track circuit and a track circuit for each speed limit signal, track circuit information that provides arrangement relationships between track circuits and relationships between the track circuits and stations, and an occupied duration at each station;

a current train occupying track position estimating unit for estimating a current train occupying track circuit from a running position of the current train and the track circuit information;

a history retaining unit for holding a history of the multistage automatic train control information, and a history of information about the current train occupying track circuit estimated by the current train occupying track position estimating unit;

an automatic train control aspect determining unit for determining an automatic train control aspect of the current train before reaching the next station from the information about the occupied track circuit on which the current train is present and the estimated information about the preceding train position; and a next station state estimating unit for estimating a preceding train position using the information in the history retaining unit and the signal aspect table, for estimating a time at which the preceding train exits the next station, the time indicating a time when the automatic train control aspect changes to another automatic train control aspect that allows a higher speed limit than the automatic train control aspect for at least a track circuit located before the next station, from the estimated information about the preceding train position and from the track circuit information.

6. The operation support device according to claim 5, further comprising:

a recommended pattern creating unit for creating a recommended running pattern for the current train to arrive at the next station from the next station exit time of the preceding train the next station state estimating unit estimates and from the position and speed of the current train; and a communication unit for notifying a driver of the recommended running pattern.

7. The operation support device according to claim 5, further comprising:

a non-stop/stop estimating unit for comparing a time necessary for the preceding train to pass through a track circuit before the next station with a predetermined threshold, and for deciding that the preceding train will stop at the next station when the time of passing through is longer than the threshold, wherein the next station state estimating unit estimates a time at which the preceding train exits the next station if a decision result of the non-stop/stop estimating unit indicates a stop at the next station.

8. An automatic operation device comprising:

an operation support device comprising:

an intake unit for acquiring multistage automatic train control information containing a speed limit signal on each track circuit of a current train;

a track database for retaining a signal aspect table that provides relation between a preceding train end occupying track circuit and a track circuit for each speed limit signal, track circuit information that provides arrangement relationships between track circuits and relationships between the track circuits and stations, and an occupied duration at each station;

a current train occupying track position estimating unit for estimating a current train occupying track circuit from a running position of the current train and the track circuit information;

a history retaining unit for holding a history of the multistage automatic train control information, and a history of information about the current train occupying track circuit estimated by the current train occupying track position estimating unit;

an automatic train control aspect determining unit for determining an automatic train control aspect of the current train before reaching the next station from the information about the occupied track circuit on which the current train is present and the estimated information about the preceding train position;

a next station state estimating unit for estimating a preceding train position using the information in the history retaining unit and the signal aspect table, for estimating a time at which the preceding train exits the next station the time indicating a time when the automatic train control aspect changes to another automatic train control aspect that allows a higher speed limit than the automatic train control aspect for at least a track circuit located before the next station, from the estimated information about the preceding train position and from the track circuit information;

a recommended pattern creating unit for creating a recommended running pattern for the current train to arrive at the next station from the next station exit time of the preceding train the next station state estimating unit estimates and from the position and speed of the current train; and a communication unit for notifying a driver of the recommended running pattern; and a notch command unit for selecting a notch in accordance with the recommended pattern created by the recommended pattern creating unit.

* * * * *